United States Patent [19]

Fridhill

[11] 4,136,430

[45] Jan. 30, 1979

[54] METHOD FOR DELINING A FURNACE OR THE LIKE

[76] Inventor: Nils T. Fridhill, Fru Alstad 1, 231 00 Trelleborg, Sweden

[21] Appl. No.: 863,869

[22] Filed: Dec. 23, 1977

[30] Foreign Application Priority Data

Dec. 30, 1976 [SE] Sweden ............................... 7614726

[51] Int. Cl.[2] ............................ F27D 1/16; B23C 1/20

[52] U.S. Cl. ...................................... 29/427; 90/12 R; 264/30

[58] Field of Search ............. 29/427, 426; 51/170 PT; 264/30; 90/12 R

[56] References Cited

U.S. PATENT DOCUMENTS

| | | | |
|---|---|---|---|
| 1,977,088 | 10/1934 | Richardson | 51/170 PT |
| 2,987,970 | 6/1961 | Watson | 90/12 R |
| 3,687,007 | 8/1972 | Harris | 90/12 R |

*Primary Examiner*—Milton S. Mehr
*Attorney, Agent, or Firm*—Bucknam and Archer

[57] ABSTRACT

This invention relates to a method of delining a furnace intended for high temperature melts, such as glass or metal melts. The lining of such a furnace usually consists of a material which closest to the furnace wall forms a layer of pulverulent material and which outside this layer consists of a layer of a very hard, almost infrangible outer mass. For such delining operation the invention suggests first removing material from the inner layer and then breaking up the outer layer in the regions where material from the inner layer has been removed. Thus, the hard outer layer is exposed and worked without any material from the inner layer in place as a support.

4 Claims, 1 Drawing Figure

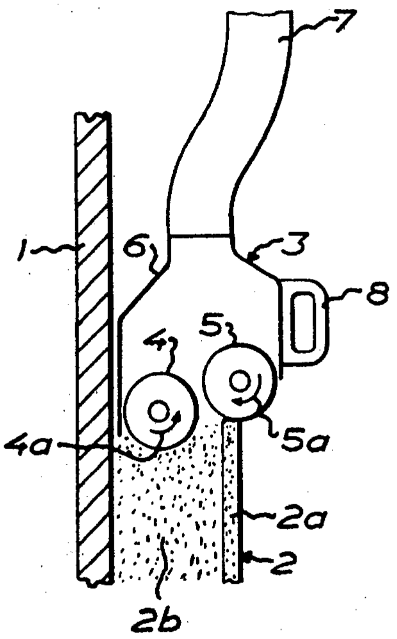
7
1
6
3
8
5
4
4a
5a
2a
2
2b

METHOD FOR DELINING A FURNACE OR THE LIKE

The present invention relates to a method for delining a furnace or the like, in which the lining consists of a hard, outer layer and a substantially pulverulent or less hard inner layer.

Furnaces, ladles, crucibles or the like intended for melts at high temperatures, such as glass or metal melts, are lined with different types of refractory materials. In certain cases, this lining consists of a material which, closest to the inner wall of the furnace, ladle, crucible or the like, forms a layer of a substantially pulverulent or relatively loosely packed material and which, outside this layer, consists of a layer of a very hard, almost infrangible outer mass. After a certain period of use, the quality of the lining deteriorates, for which reason it must be removed and replaced with a new lining. The delining operation is associated with certain problems, partly because the lining is almost infrangible and can be broken up only with difficulty, and partly because the delining work is injurious to health as a result of excessive dust formation.

Consequently, the object of the present invention is to realize a method which makes a simple and dust-free delining possible.

According to a major aspect of the present invention, material from the inner layer of the lining is removed and the outer layer is thereafter broken up at those regions where the material from the inner layer was removed.

The nature of the present invention and its aspects will be more readily understood from the following brief discussion relating to the accompanying drawing which schematically illustrates the principle of the delining method according to the present invention.

The reader is now referred to the accompanying drawing which shows a furnace wall 1 which supports, on its side facing the interior of the furnace, a lining 2. This lining consists of a very hard outer layer **2*a* and a substantially pulverulent inner layer 2*b*. Furthermore, the drawing shows a tool 3 for breaking and removing the lining 2. The tool 3 comprises a first milling cutter 4 and a second milling cutter 5 which are disposed in a suction hood 6. The suction hood 6 is connected to a suction hose 7 which is coupled to a suction device (not shown). Furthermore, the tool 3 is provided with a handle 8 for manual operation of the tool 3**.

The tool 3 is operative to work through the lining 2 in a downward directon, the first milling cutter 4 which is provided for working the inner layer **2*b*, being located (as is apparent from the drawing) slightly below the second milling cutter 5 which is provided for working the outer layer 2*a*. This implies that the first milling cutter 4 works and comminutes the inner layer 2*b* in a certain region, whence material is removed by suction via the suction hood 6 and the suction hose 7 before the second milling cutter 5 works and comminutes the hard, outer layer 2*a* in the same region, whence material is also removed by suction via the suction hood 6 and suction hose 7. Thus the second milling cutter 5 works the hard, outer layer 2*a* only when this has become exposed by removal of the inner layer 2*b* beneath the point of working. It has proved that the hard, outer layer will, as a result of this exposure, be considerably easier to break up than if it were worked with the inner layer 2*b*** in place as a suppport.

The inner milling cutter 4 may be dispensed with in certain cases; namely when the inner layer **2*b* consists of a pulverulent material which can be removed directly by suction without the need of first being worked. The first milling cutter 4 can, like the second milling cutter 5, be replaced by other types of tools, such as for example impact tools or chisel tools. However, the advantage gained by a pair of milling cutters 4 and 5 is that larger pieces of the outer layer 2*a* broken off by the milling cutter 5 can be comminuted between the two milling cutters (rotating in the directions shown by the arrows 4*a* and 5*a*) and thereby be more easily removed by suction via the suction hood 6 and suction hose 7**.

I claim:

1. A method of delining a furnace or the like, in which the lining consists of a hard, outer layer and a substantially pulverulent or less hard, inner layer, first removing material from the inner layer, and thereafter breaking up the outer layer in those regions where material from the inner layer was removed.

2. The method as recited in claim 1, characterized in that the material in the inner layer is worked by means of a tool before being removed.

3. The method as recited in claim 1 characterized in that the material in the inner layer is removed by suction.

4. The method as recited in claim 1 characterized in that the outer layer is removed by suction after being broken up.

* * * * *